(12) United States Patent
Lim et al.

(10) Patent No.: US 9,148,549 B2
(45) Date of Patent: Sep. 29, 2015

(54) IMAGE PROCESSING METHOD AND IMAGE PROCESSING APPARATUS USING TIME AXIS LOW BAND PASS FILTER

(71) Applicants: SNU Precision Co., Ltd., Seoul (KR); UMecha Co., Ltd., Siheung-si, Gyeonggi-do (KR)

(72) Inventors: Chang Kue Lim, Seoul (KR); Souk Kim, Seoul (KR); Chang-Yong Um, Bucheon-si (KR); Hyung-Bae Park, Gwangmyeong-si (KR)

(73) Assignees: SNU PRECISION CO., LTD., Chungcheongnam-do (KR); UMECHA CO., Ltd., Gyeonggi-do (KR)

( * ) Notice: Subject to any disclaimer, the term of this patent is extended or adjusted under 35 U.S.C. 154(b) by 275 days.

(21) Appl. No.: 13/827,318

(22) Filed: Mar. 14, 2013

(65) Prior Publication Data

US 2014/0085454 A1 Mar. 27, 2014

(30) Foreign Application Priority Data

Sep. 27, 2012 (KR) .................. 10-2012-0108068

(51) Int. Cl.
*H04N 5/21* (2006.01)
*H04N 7/18* (2006.01)
*H04N 9/47* (2006.01)
*G06T 5/00* (2006.01)
*G06T 5/50* (2006.01)

(52) U.S. Cl.
CPC *H04N 5/21* (2013.01); *G06T 5/002* (2013.01); *G06T 5/50* (2013.01); *H04N 7/18* (2013.01); *G06T 2207/10056* (2013.01); *G06T 2207/20182* (2013.01); *G06T 2207/20216* (2013.01)

(58) Field of Classification Search
None
See application file for complete search history.

(56) References Cited

U.S. PATENT DOCUMENTS

| 5,420,431 A * | 5/1995 | Nishiki | 250/370.09 |
| 2013/0215244 A1* | 8/2013 | Mestha et al. | 348/77 |
| 2013/0250176 A1* | 9/2013 | Fukui | 348/607 |

FOREIGN PATENT DOCUMENTS

| JP | H-08-163408 A | 6/1996 |
| JP | 2005-311742 A | 11/2005 |
| JP | 2007-295565 A | 11/2007 |
| JP | 2010-028817 A | 2/2010 |
| KR | 2006/0013726 A | 2/2006 |

OTHER PUBLICATIONS

Office Action dated Oct. 29, 2013 in Korean Application No. 10-2012-0108068.

* cited by examiner

*Primary Examiner* — Joseph Ustaris
*Assistant Examiner* — Talha Nawaz
(74) *Attorney, Agent, or Firm* — Saliwanchik, Lloyd & Eisensehenk

(57) ABSTRACT

An image processing apparatus and image processing method according to the present disclosure are characterized to obtain N number of image data regarding a same object, each N number of image data consisting of a plurality of pixels; remove noise data of among N number of pixel data regarding pixels in a same location, from the N number of image data; and generate an image of the object using data excluding the noise data.

5 Claims, 6 Drawing Sheets

IMAGE PROCESSING METHOD AND IMAGE PROCESSING APPARATUS USING TIME AXIS LOW BAND PASS FILTER

CROSS-REFERENCE TO RELATED APPLICATION

This application claims the benefit under 35 U.S.C. §119 of Korean Patent Application No. 10-2012-0108068, filed Sep. 27, 2012, which is hereby incorporated by reference in its entirety.

BACKGROUND

1. Field of the Invention

The following description relates to an image processing method and image processing apparatus, for example, an image processing method which may obtain clear images using a time axis low band pass filter, and an image processing apparatus thereof.

2. Description of Related Art

As illustrated in FIG. 1, an electron microscope generates a scan electron beam of XV direction in an electron gun 1, and irradiates the electron beam to a sample 2 placed on a lower portion of an evacuated chamber 10. An electron returning from the sample to which the electron beam is irradiated is detected by a highly sensitive sensor PMT (3: photomultiplier tube), and a weak second electron is amplified. The amplified second electron passes an AD converter (ADC) and is accumulated in a memory as image data, and the created image is transmitted to a control computer and is displayed on a monitor 40. A user becomes able to check the monitor and find or analyze a defect of a surface of the sample such as a wafer.

An image processing apparatus is an essential apparatus attached to such an electron microscope or a 3 dimensional focused ion-beam lithography etc. An image processing apparatus generates signals controlling electron beams and forms images of samples. It is the most important element in an electron microscope, or a 3 dimensional focused ion-beam apparatus where high resolution and quality image is an important function.

A conventional image processing apparatus obtains one image by consecutively expressing a signal of a secondary electron detected by a PMT, and sequentially obtains a total of N number of images in the same method.

Such an image consists of a same size and same number of pixels regarding a same object. However, in the process of creating an image as illustrated in FIG. 2 where grey level values (dotted line graph in FIG. 2) of the same location pixel of 128 image data are sequentially generated, noise occurs due to electrical or mechanical vibration, and thus the grey level values of the pixels in the same location are not identical. And in the case of creating an image of a sample by simply combining such N number of images, it is impossible to generate an exact image of the sample as illustrated in FIG. 3.

Therefore, in most commercial products, an image including noise is converted into a high quality image through an after-process, wherein the most frequently used method is the moving average filter method.

The moving average filter method is a method of averaging the grey values of the pixels in the same location in N number of images to form one integrated image using the average value. In the case of performing such an after-process, it is possible to obtain clearer images than those obtained when just combining N number of images as illustrated in FIG. 4.

An image which has been after-processed by the moving average filter method is clearer than an image which has not been after-processed, but there is a problem that, when the image shakes in X and Y directions due to mechanical vibration, boundary lines are averaged and thus edges become unclear and the image appears somewhat murky.

BRIEF SUMMARY

A purpose of the present disclosure for resolving the aforementioned problems is to provide an image processing method capable of generating clearer images than the moving average filter method, and an image processing apparatus thereof.

Another purpose of the present disclosure is to provide an image processing method capable of removing incorrect image data so as to generate clearer images, and an image processing apparatus thereof.

Another purpose of the present disclosure is to provide an image processing method capable of removing noise in a high frequency area using a low band filter to generate a clearer image, and an image processing apparatus thereof.

Another purpose of the present disclosure is to provide an image processing method capable of reducing error in an analogue-digital conversion using a plurality of AD converters, and an image processing apparatus thereof.

According to an exemplary embodiment of the present disclosure for achieving the aforementioned purpose, there is provided an image processing method comprising obtaining N number of image data regarding a same object, each N number of image data consisting of a plurality of pixels; removing noise data of among N number of pixel data regarding pixels in a same location, from the N number of image data; and generating an image of the object using data excluding the noise data.

According to an exemplary embodiment of the present disclosure, the noise data may be data with a frequency at least a cutoff frequency or above than the rest of the N pixel data excluding the noise data, and the removing noise data may remove noise data using a time axis low band pass filter.

According to an exemplary embodiment of the present disclosure, a transfer function of the low band pass filter may be as in the mathematical formula below:

$$H(j\omega) = \frac{1}{1 - \left(\frac{\omega}{\omega_n}\right)^2 + \frac{j\omega}{Q\omega_n}}$$

where Q is a quality factor, and $\omega_n$ is a natural frequency.

According to an exemplary embodiment of the present disclosure, the image processing apparatus and image processing method may form the image data by converting an analogue signal obtained through scanning the object into a digital signal by two or more AD converters, and then averaging a plurality of converted digital signals.

An image processing apparatus and image processing method according to the present disclosure has an effect of reducing error in the analogue-digital conversion using a plurality of AD converters, and removing incorrect pixel data of a high frequency area using a low band filter, thereby providing clearer images than the conventional moving average filter method.

Other features and aspects may be apparent from the following detailed description, the drawings, and the claims.

DETAILED DESCRIPTION

Figure 1:
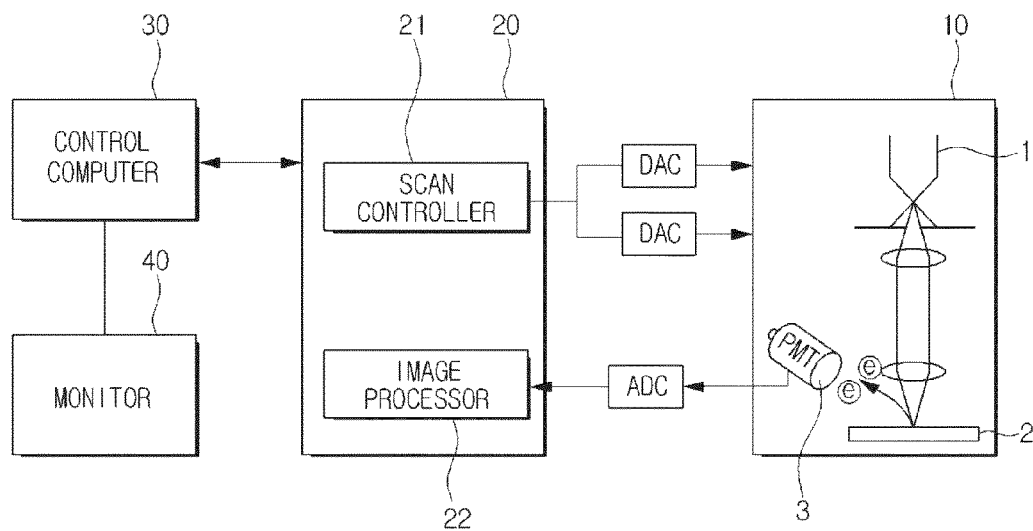
FIG. 1 is a block diagram illustrating a conventional electron beam system.

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increase clarity and conciseness.

An image processing apparatus 200 according to the present disclosure is an apparatus used in electron microscopes and ion-beam apparatuses. Such an image processing apparatus 200 includes a scan controller 210 which generates control signals for scanning an object 2 and an image processor 220 which for images of the object, as illustrated in FIG. 5

The image processing apparatus 200 generates a control signal tier controlling an electron gun 1 by a command from a control computer, and uses a signal sensed by a PMT 3 to form an image of an object in the image processor 220 and transmits the formed image to a control computer 30. The transmitted image of the object is provided through a monitor to be seen by a user.

Figure 5:
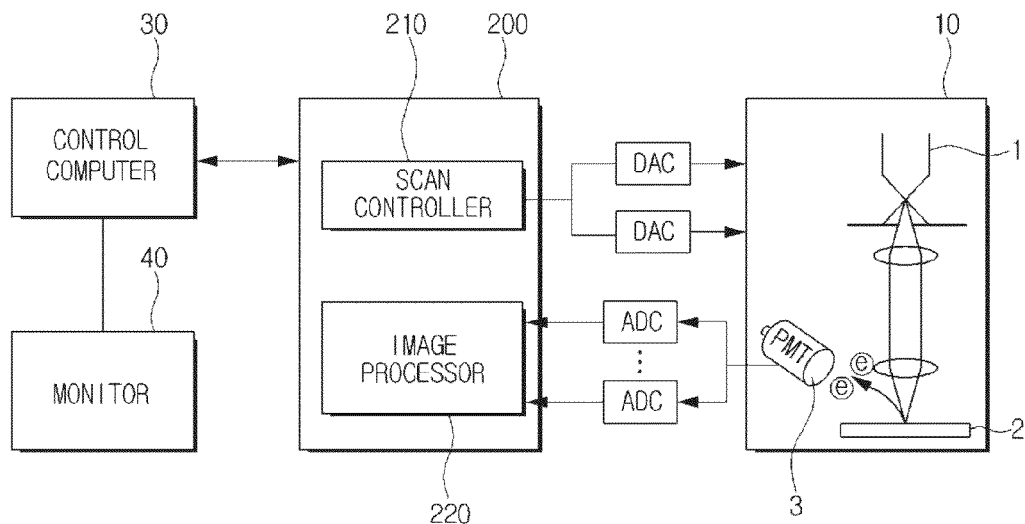
FIG. 5 is a block diagram illustrating an electron beam system including an image processing apparatus according to the present disclosure.

In FIG. 5, the image processing apparatus 200 according to the present disclosure is illustrated as an apparatus separate from a control computer 30, digital-analogue converter DAC, and analogue-digital converter ADC, but it may also be embodied as one apparatus having all such configurative elements.

An image processing apparatus according to the present disclosure is an apparatus for providing clearer images than a conventional image processing apparatus, and is characterized to have an average digital signal module and time axis low band pass filter in an image processor 220.

An average digital signal module is a module which averages digital signals from a plurality of ADCs to generate one digital signal.

A conventional electron microscope system illustrated in FIG. 1 converts an analogue signal from a PMT 3 into a digital signal using one ADC, and uses the converted digital signal to form image data. However, a data error may occur in the process of signal conversion by the ADC, and this error may generate incorrect image data regarding an object.

On the other hand, a system which uses an image processing apparatus according to the present disclosure has a plurality of ADCs for converting an analogue signal from the PMT 3 into a digital signal. Each digital signal converted by the plurality of ADCs is transmitted to the image processing apparatus according to the present disclosure, and then the digital signals are made into one digital signal.

An image processing apparatus according to the present invention may minimize a range of error which may occur during data conversion by ADCs by averaging and using digital signals from a plurality of analogue-digital converters (ADC). Accordingly, it becomes possible to generate more exact data.

Image data generated as aforementioned is stored in a memory inside the image processing apparatus 200, and the electron microscope system generates N number of image data continuously in the same method, and stores the generated N number of image data in the memory.

Figure 2:
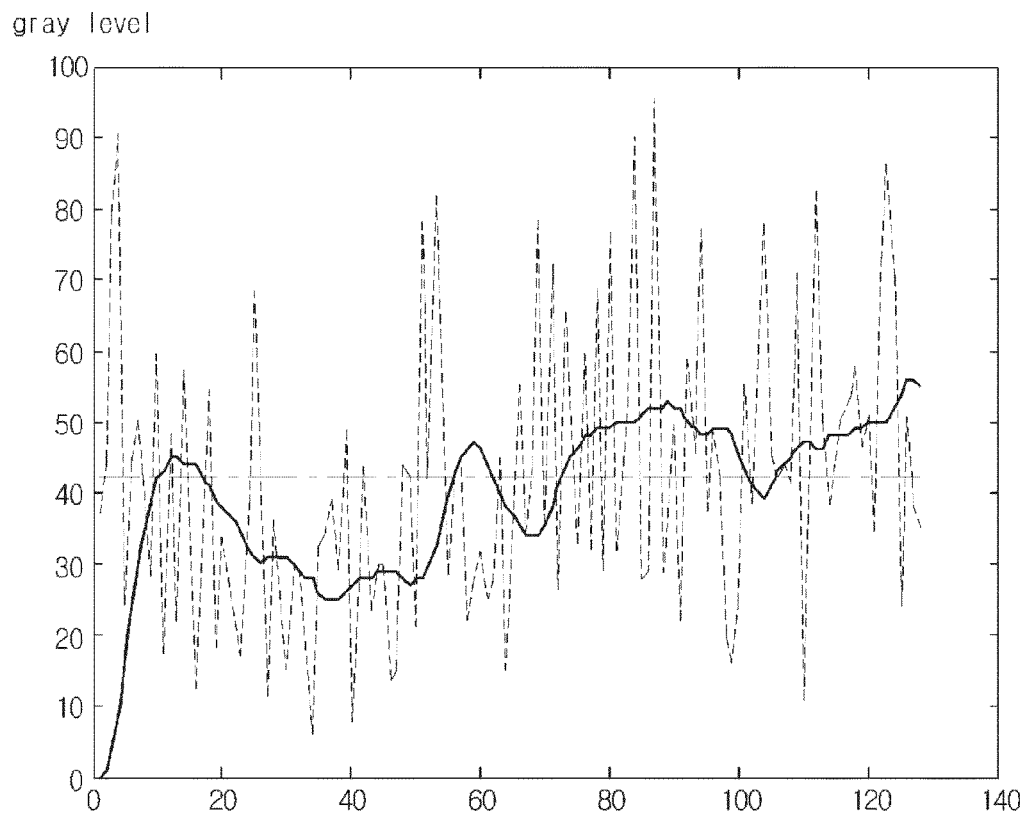
FIG. 2 is a graph illustrating changes of grey levels and grey level average values in a same pixel.

Each of the N number of image data has a same number of pixels, and the image data relates to a same object, and thus pixels of a same location should have a same grey value, but as explained above with reference to FIG. 2, due to electrical or mechanical noise occurring in the process of generating image data, each pixel has different grey levels, thereby causing the electron microscope system to provide unclear images to the user.

To resolve the aforementioned problem, an image processing apparatus according to the present disclosure removes data values corresponding to the noise from the data values of the pixels in the same location, and generates images of an object, thereby providing clearer images to the user.

Hereinbelow is detailed explanation on an image processing method according to the present disclosure.

In a conventional average filter method for improving quality of an image, if grey levels obtained for a same pixel of, for example five image data were 50, 50, 50, 100, 50, the average value, that is 60, would be determined as the grey level of the corresponding pixel, and the grey levels obtained for neighboring pixels would be 100, 100, 50, 100, and thus the average value, that is 90, would be determined as the grey level. Consequently, the image would become unclear.

On the other hand, an image processing method according to the present disclosure removes the pixel data of the fourth image data which has a different grey level than other grey levels of among the five image data, and thus it becomes possible to create a more precise and clearer image on the original image in the edges compared to the conventional average filter.

There may be various methods for differentiating such noise data, but as a result of observing image data in the frequency perspective, it was possible to identify that the data corresponding to noise is data having high frequency, and thus an image processing method according to an exemplary embodiment of the present invention determines that data having a frequency which is at least a predetermined cutoff frequency or above than the rest of the pixel data from the N number of pixel data values as noise and removes the determined high frequency data.

An image processor 220 according to an exemplary embodiment of the present disclosure is embodied to include a low band filter (LPF) which passes only data of low frequency band, so as to remove noise having high frequency and generate clear images effectively.

The low band filter used in an image processing apparatus according to the present disclosure is a time axis low band filter having a transfer function as shown below.

$$H(s) = \frac{1}{1 + 2\zeta \frac{s}{\omega_n} + \left(\frac{s}{\omega_n}\right)^2} = \frac{1}{1 + \frac{s}{Q\omega_n} + \left(\frac{s}{\omega_n}\right)^2}$$

-continued $$H(j\omega) = \frac{1}{1 - \left(\frac{\omega}{\omega_n}\right)^2 + \frac{j\omega}{Q\omega_n}}$$

$$20\log_{10}|H(j\omega)| = 20\log_{10}\left|1 - \left(\frac{\omega}{\omega_n}\right)^2 + \frac{j\omega}{Q\omega_n}\right|^{-1}$$

$$= -20\log_{10}\sqrt{\left(1 - \frac{\omega^2}{\omega_n^2}\right)^2 + \left(\frac{\omega}{Q\omega_n}\right)^2}$$

Figure 6:
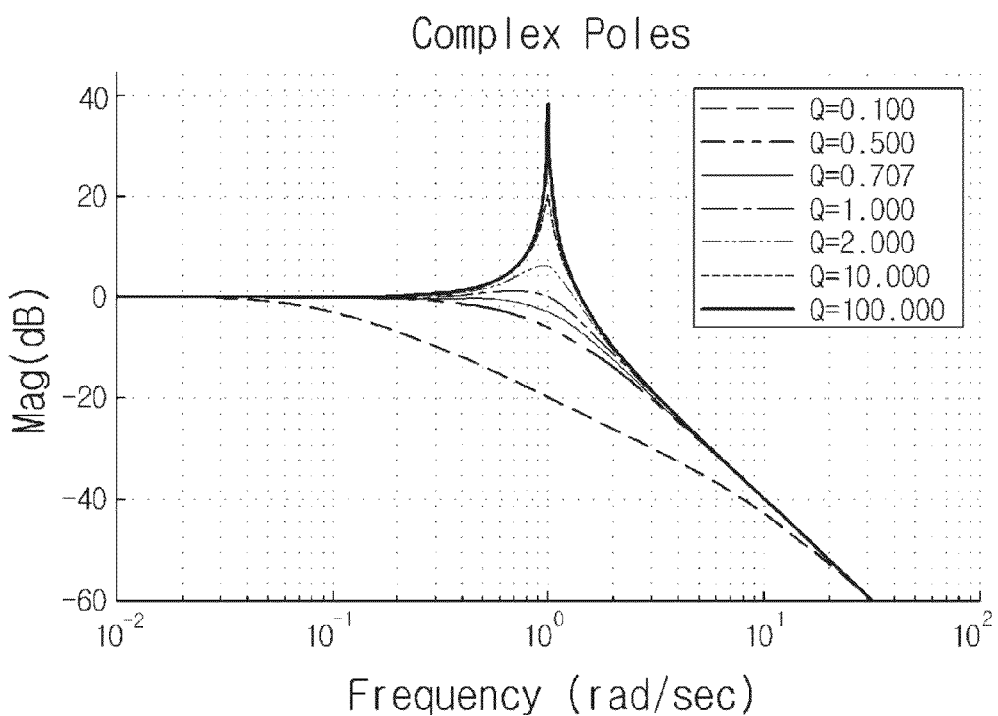
FIG. 6 is a graph showing changes of performance of a low band pass filter according to changes of a Q value.

Herein, Q is quality factor, and $\omega_n$ is a natural frequency. As illustrated in FIG. 6, filter performance depends on Q value, and although the Q value may be appropriately selected by those skilled in the art, approximately 0.707 is a desirable value for Q.

Figure 3:
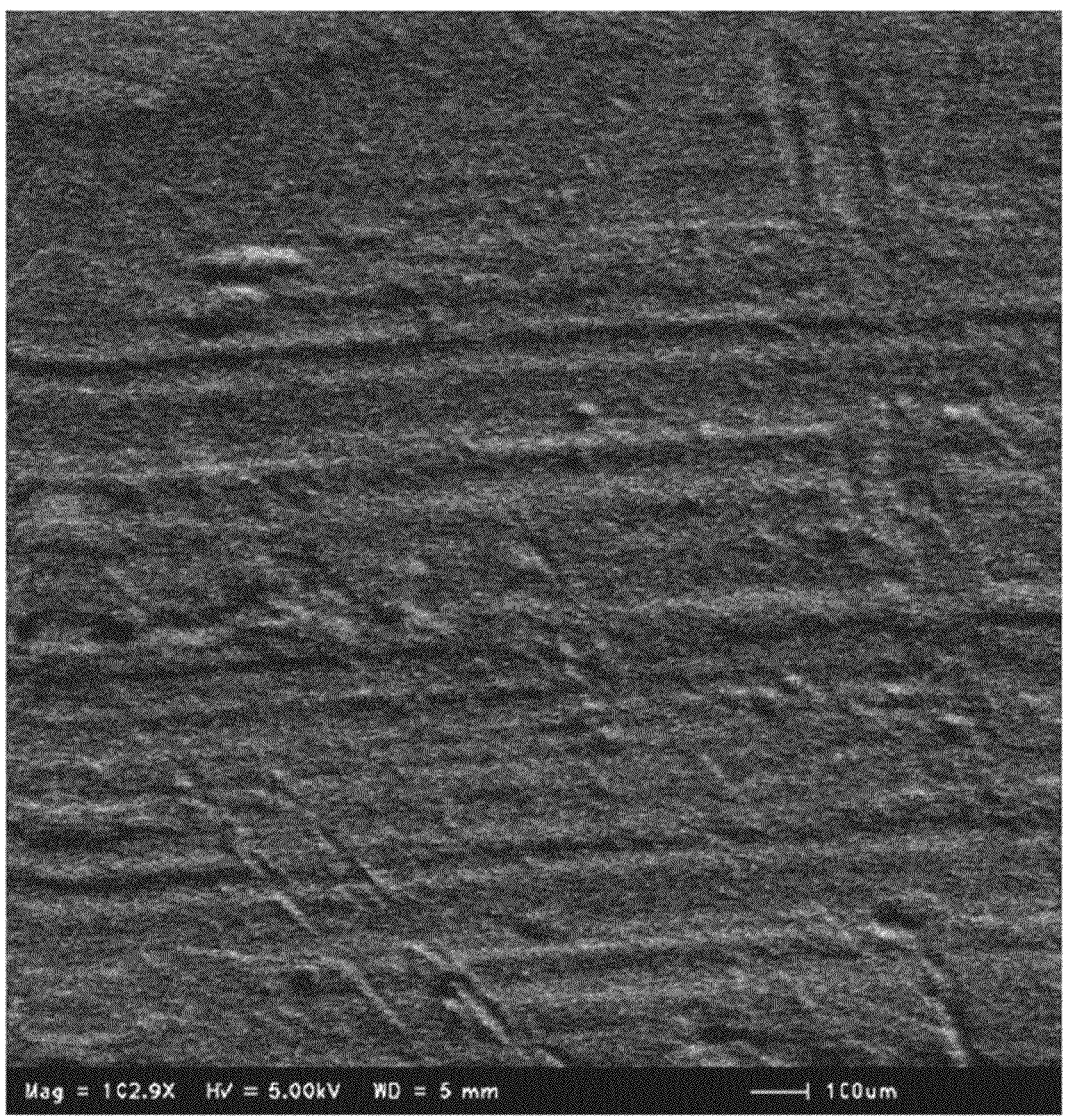
FIG. 3 is an image which has not been after-processed in an electron beam system.
Figure 4:
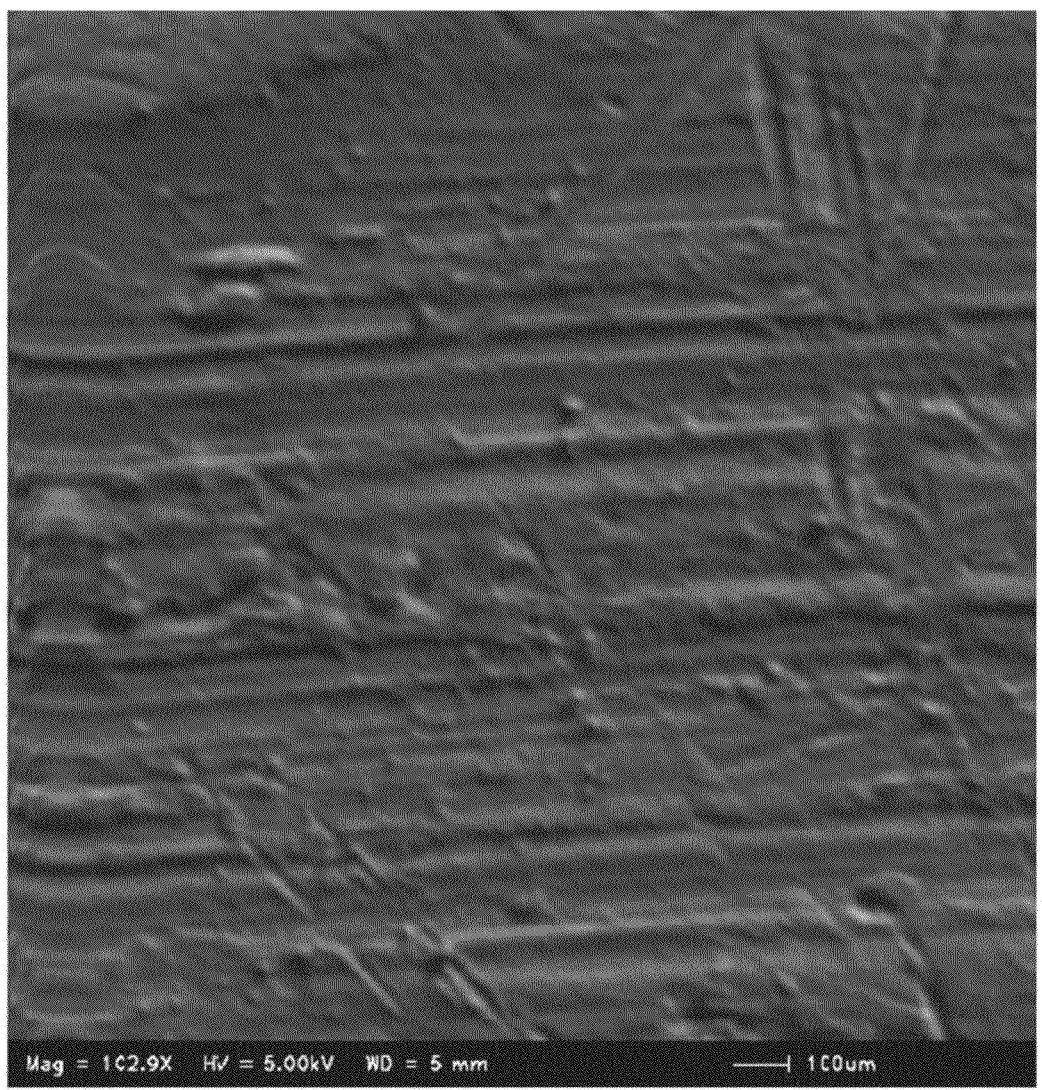
FIG. 4 is an image where an average filter has been used.
Figure 7:
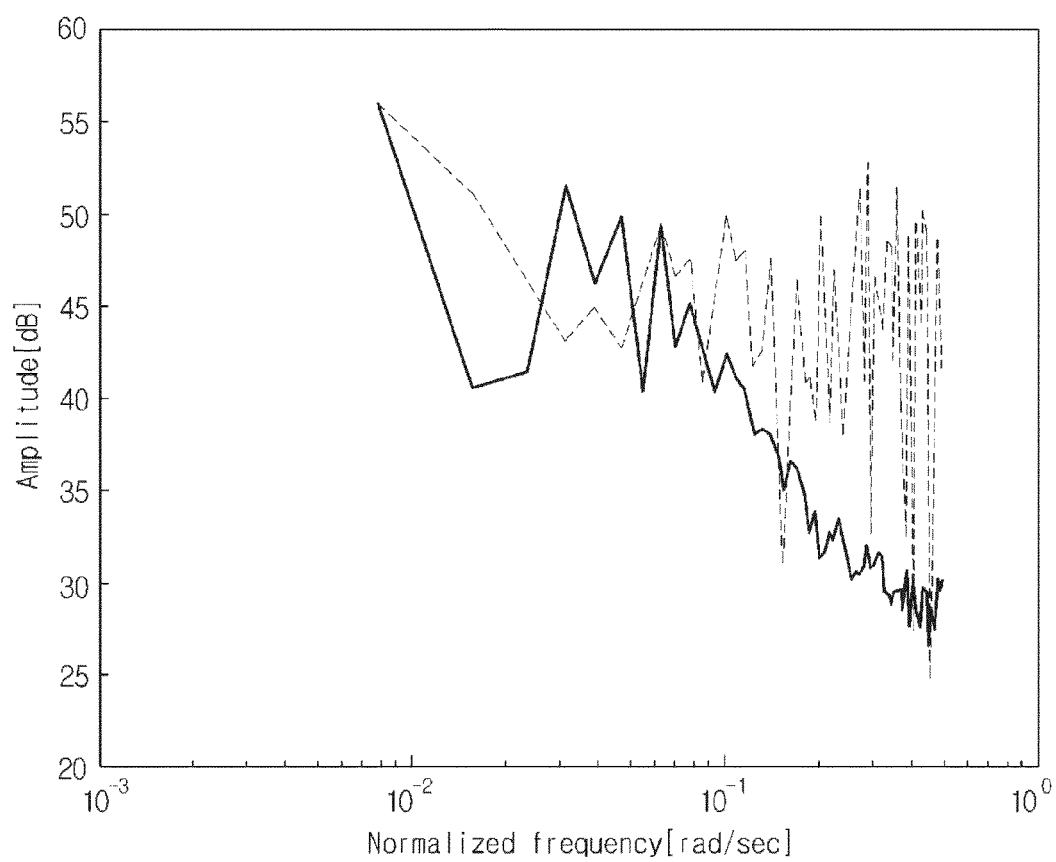
FIG. 7 is a graph showing changes when a low band pass filter has been used.
Figure 8:
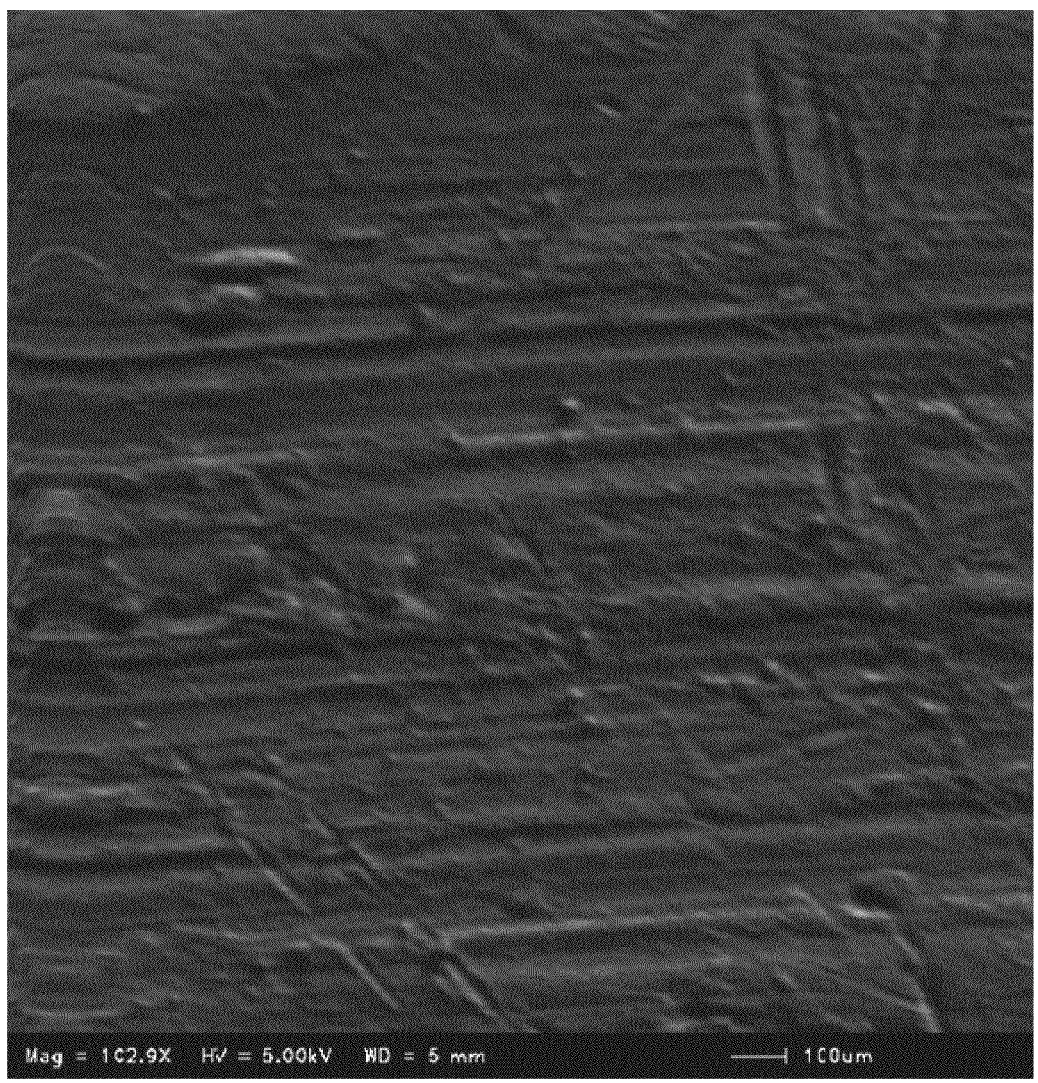
FIG. 8 illustrates an image which has been after-processed in an image processing method according to the present disclosure.

It can be seen that data of high frequency area has been removed after a processing using a low band pass filter (solid line in FIG. 7) when compared to before using the low band filter (dotted line in FIG. 7). As illustrated in FIG. 8, as a result of generating an image after removing noise, it becomes possible to obtain a clearer image than before the noise is removed (image of FIG. 3) when a conventional average filter (image of FIG. 4) is used.

Especially, it can be seen that the image processing method and image processing apparatus according to the present disclosure may remove electrical noise by a low frequency pass filter when an image shakes due to vibration and electrical noise is included, and may inhibit edges from appearing murky in conventional methods using average filters.

An image processing method according to the present disclosure uses a time axis low band pass filter, and thus there is no difference from before processing the image data, but when using at least three image data measured continuously, it is possible to obtain the effect of improving the images by a time axis pass filter.

In addition, an electron beam system having an image processing apparatus according to the present disclosure may generate an image using all image data since the start of measurement of an image regarding a same object until the image is provided.

However, considering the capacity of the internal memory of the system, it is possible to set such that images of an object is generated with only the predetermined N number of image data, and herein, it is desirable that the N number of image data are the most recently generated N number of image data as of the present point.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing method comprising:
   obtaining N number of image data regarding a same object, each of the N number of image data comprising a plurality of pixels;
   removing noise data of N number of pixel data regarding pixels in a same location, from the N number of image data; and
   generating an image of the object using the N umber of image data excluding the noise data;
   wherein the noise data is data with a frequency being at least a cutoff frequency or greater than that of the rest of the N pixel data excluding the noise data,
   wherein the removing noise data removes the noise data using a time axis low band pass filter, and
   wherein the low band pass filter comprises a circuit configured to satisfy a transfer function shown below:

$$H(j\omega) = \frac{1}{1 - \left(\frac{\omega}{\omega_n}\right)^2 + \frac{j\omega}{Q\omega_n}}$$

where Q is a quality factor, and $\omega_n$ is a natural frequency.

2. The image processing method according to claim 1, wherein, in the obtaining N number of image data, each image data is determined by converting an analogue signal obtained through scanning the object into a digital signal by two or more AD converters, respectively, and then averaging a plurality of converted digital signals.

3. An image processing apparatus comprising:
   a scan controller which generates a control signal for scanning an object; and
   an image processor which forms and stores image data regarding the object, and forms a present image regarding the object using N number of image data regarding the object, each of the N number of image data comprising a plurality of pixels,
   wherein the image processor removes noise data of N pixel data regarding pixels in a same location from the N number of image data and forms a present image using the rest of the data;
   the noise data is data with a frequency being at least a cutoff frequency or greater than that of the rest of the N pixel data excluding the noise data,
   wherein the image processor comprises a time axis low hand pass filter for removing the noise data, and
   wherein the low hand pass filter comprises a circuit configured to satisfy a transfer function shown below:

$$H(j\omega) = \frac{1}{1 - \left(\frac{\omega}{\omega_n}\right)^2 + \frac{j\omega}{Q\omega_n}}$$

where Q is a quality factor, and $\omega_n$ is a natural frequency.

4. The image processing apparatus according to claim 3, wherein the N number of image data are N number of image data formed most recently as of the present point.

5. The image processing apparatus according to claim 3, wherein the image processor forms the image data by converting an analogue signal obtained through scanning the object into a digital signal by two or more AD converters, respectively, and then averaging a plurality of converted digital signals.

* * * * *